May 6, 1924.
H. D. HEEREN
CORN SHIELD FOR CULTIVATORS
Filed May 29, 1922
1,492,979
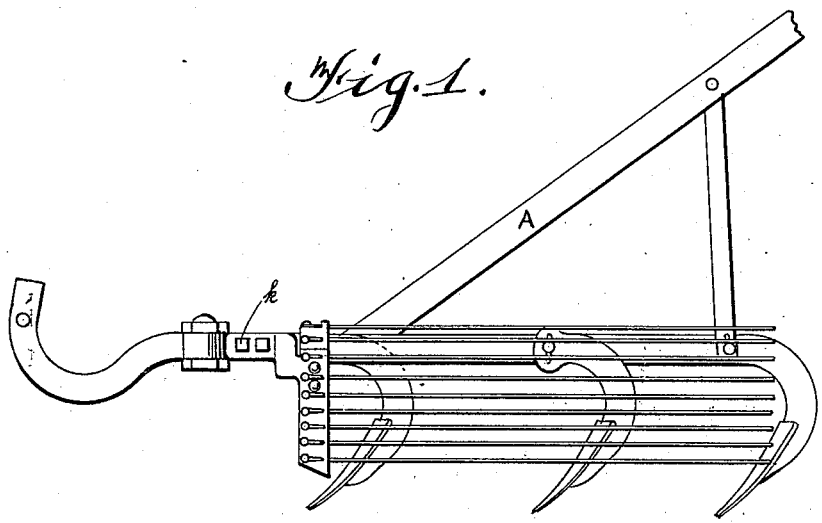
Fig. 1.
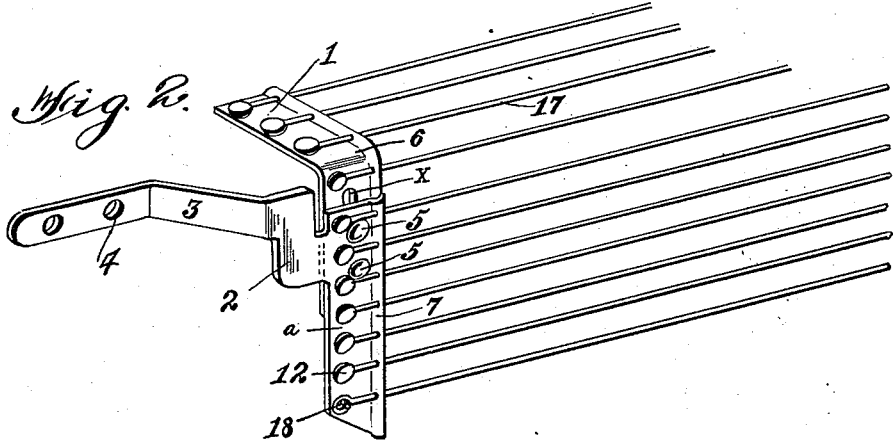
Fig. 2.
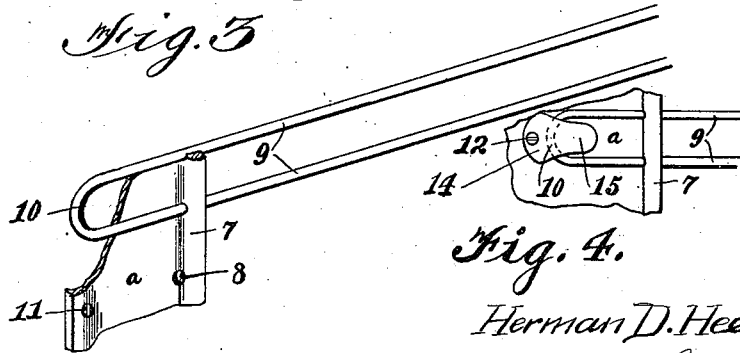
Fig. 3.
Fig. 4.
Inventor
Herman D. Heeren Patented May 6, 1924.

1,492,979

UNITED STATES PATENT OFFICE.

HERMAN D. HEEREN, OF LE MARS, IOWA.

CORN SHIELD FOR CULTIVATORS.

Application filed May 29, 1922. Serial No. 564,581.

*To all whom it may concern:*

Be it known that I, HERMAN D. HEEREN, a citizen of the United States, and a resident of Le Mars, in the county of Plymouth and State of Iowa, have invented certain new and useful Improvements in Corn Shields for Cultivators, of which the following is a specification, reference being had to the accompanying drawings, forming a part of this specification.

My invention has for its object to improve the construction of that class of shields which are attached to a cultivator and are employed to protect the growing plants.

Another object of my invention is to provide a shield of the character described of simple construction which is readily adjustable.

With these and other objects in view, the present invention consists in the combination and arrangement of parts as will be hereinafter more fully described and finally pointed out in the appended claim, it being further understood that changes in the specific structure shown and described may be made within the scope of the claim without departing from the spirit of the invention.

In the accompanying drawings forming a part of this specification, and in which like numerals of reference indicate similar parts in the several views:

Figure 1 shows a side elevational view of a cultivator with my shield attached.

Figure 2 is a perspective view of my shield.

Figure 3 is a broken detail of a shield showing one of the modified pins in position.

Figure 4 is a detail of one of the clips as used in my invention.

In the accompanying drawings A represents a cultivator to which my shield is attached, the numeral 1, representing the main holder having the upwardly extending ear 2, to which is continued the laterally off-set securing arm 3 terminating in the securing portion containing apertures 4.

As shown in Figure 2, the main holder is provided with the adjusting bolts 5 which hold the right angularly bent auxiliary member 6, having the slots $x$, to adjustably receive the bolts 5.

As clearly shown in the drawings each member 1 and 6 comprise a main portion $a$ from which extends at a right angle a perforated edge 7 having suitable perforations 8 through which extends the tines 9 of the U-shaped rods, the edge opposite being perforated as shown at 11 to receive suitable securing bolts 12 which hold the securing clips 15 in position.

As shown in Figure 4 the clips are provided with a flat securing portion 14 from which extends a curved securing finger end 15 adapted to overlie the central portion of the rods 10.

In Figures 1 and 2 is shown a modification in which I employ straight rods 17 each ending in an eye, to receive a bolt 18.

By means of these adjusting bolts 5 the auxiliary member 6 can be raised or lowered to accommodate the height of the growing plants.

Having thus described my said invention what I claim as new and desire to secure by U. S. Letters Patent is:

A shield of the character described including in combination a main member comprising a flat portion having an inner and upward directed ear ending in a laterally offset securing arm, bolts in said main portion, a right angularly bent auxiliary portion held to said main portion by said bolts passing through suitable slots in said auxiliary portion, each of said portions having an angularly bent perforated inner edge, U-shaped rods the tines of which pass through said perforations, securing bolts in said member, and clips on said securing bolts for holding said rods in position, all as and for the purpose set forth.

In testimony whereof I affix my signature.

HERMAN D. HEEREN.